United States Patent Office 3,424,830
Patented Jan. 28, 1969

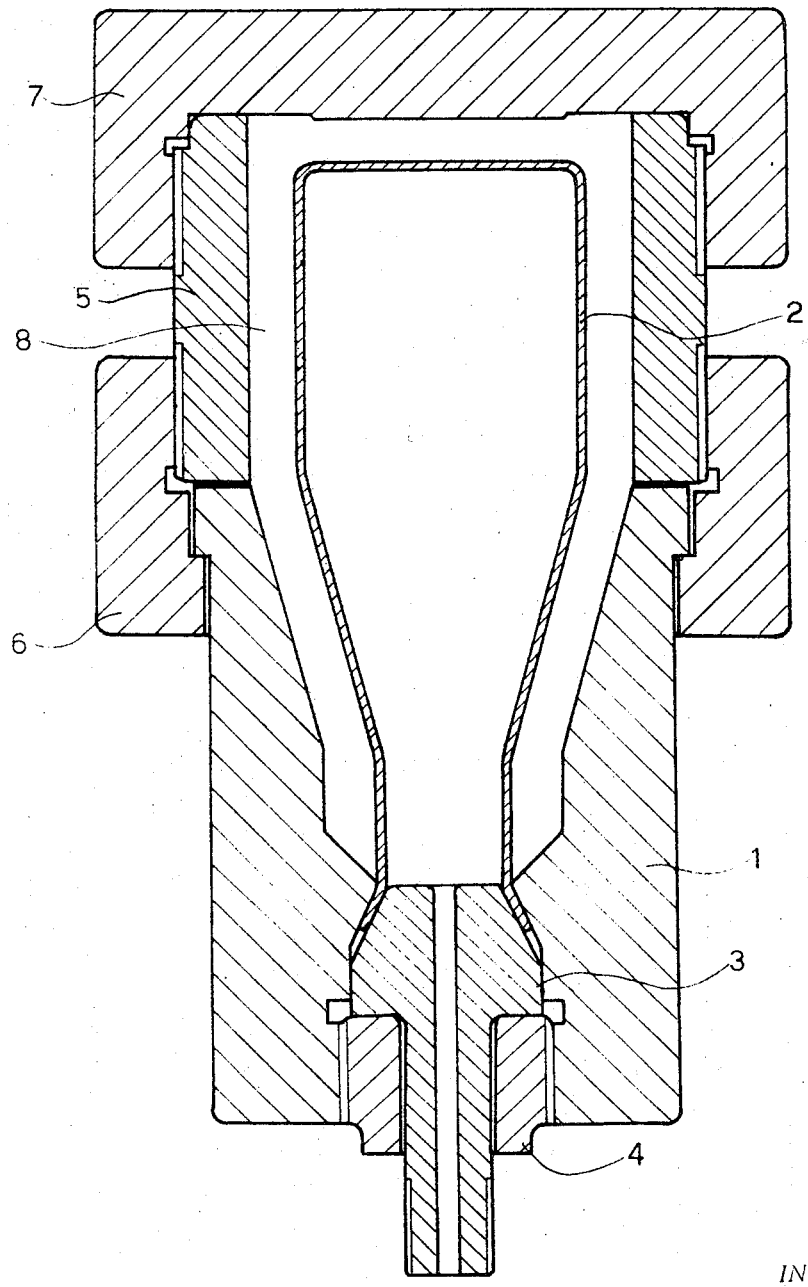

3,424,830
PROCESS FOR MOLDING HOLLOW, SHAPED ARTICLES OF POLYTETRAFLUOROETHYLENE
Pierluigi Sfondrini, Rho, Milan, and Giovanni Convalle, Bollate, Milan, Italy, assignors to Montecatini Edison, S.p.A., Milan, Italy
Filed Aug. 12, 1965, Ser. No. 479,086
Claims priority, application Italy, Aug. 18, 1964, 17,943/64
U.S. Cl. 264—127    8 Claims
Int. Cl. B29d 23/01

ABSTRACT OF THE DISCLOSURE

Polytetrafluoroethylene is molded into hollow, shaped articles having at least one open end by compacting the same in the interspace defined by the inner walls of a rigid mold and the outer walls of a thermoplastic counter-mold. The exterior geometry of the said counter-mold approximates that of the inner walls of the said rigid mold.

---

The present invention relates to a method for the production of hollow articles of polytetrafluoroethylene, and, more particularly, it relates to hollow articles having an irregular cross-section and prepared from powdery polytetrafluoroethylene.

The use of articles made from polytetrafluloroethylene has been spreading steadily inasmuch as said polymer is generally employed in all operations wherein particularly reactive chemicals are used. Polytetrafluoroethylene is in fact quite resistant to organic solvents; can withstand temperatures of up to 300° C. in the presence of oxygen; does not burn; is perfectly dielectric; and its surface is smooth even at high temperatures.

The aforesaid characteristics of stability make it difficult, however, to form shaped articles from polytetrafluoroethylene.

It is known in the prior art that hollow objects, such as pipes, cylindrical containers and the like, can be prepared from solid blocks of polytetrafluoroethylene by working these pieces individually on a lathe.

It is also known in the art to prepare the hereinabove mentioned hollow articles from granular polytetrafluoroethylene by preforming said articles by compressing the granules of the polytetrafluoroethylene material into the interspace formed between a rigid inner core and an outer mold, so as to obtain a shaped article that is then subjected to a heat treatment and, if desired, subjected to a further compression during or subsequent to molding.

Furthermore, it is also known to prepare cylindrical hollow articles of polytetrafluoroethylene from granular material by preforming said articles by compression of the polymer in the interspace between a deformable core and the inner wall of a rigid cylindrical mold closed at one of its ends; articles thus prepared are subsequently transformed into finished products by heating.

All these prior art systems display considerable drawbacks, however; thus, the production of hollow articles from blocks of material by machining them individually on a lathe, involves the expenses of time and labor and is also characterized by considerable amounts of valuable scrap material. Moreover, the above mentioned processes that use starting materials of either a powdery, granular, flaky or other like consistency and use preforming equipment exhibit considerable difficulties whenever shaped articles are required that have walls of uniform thickness and perfectly smooth surfaces and which do not require finishing operations on machine tools in order to eliminate manufacturing faults.

The greatest disadvantage exhibited by these known processes, however, is that such processes can be utilized only in the manufacture of shaped articles having uniform cross-section.

Accordingly, it is an object of the present invention to provide a process for preparing hollow articles of irregular cross-section along their axes from polytetrafluoroethylene and which process does not exhibit the drawbacks of known prior art.

Another object of the present invention is that of providing a process for the production of hollow bodies of relatively complex shape from polytetrafluoroethylene and which avoids the waste of costly raw materials and reduces production times.

A further object of this invention is that of providing a process for the production of hollow articles of polytetrafluoroethylene which will effect articles of uniform wall thickness, homogeneity throughout and a perfect smoothness of both outer and inner surfaces.

It is yet another object of this invention to provide a process for the preparation of hollow articles of polytetrafluoroethylene which permits of the preparation of articles of a complex shape having one end closed but at least one end open, such as, for example, standard commercial containers for liquids.

The present invention briefly consists of a process for the production of hollow articles of polytetrafluoroethylene starting from a powdery polymer thereof, and which includes:

(1) A phase for preforming the article which phase consists in compressing the granular material into the interspace formed between the inner walls of a composite rigid mold and the outer walls of an elastic, thermoplastic, hollow counter-mold situated inside the rigid mold and in which counter-mold a pressure is built up that will cause the elastic walls of the counter-mold to expand, thereby effecting a mechanical compression on the granular material by pressing it against the walls of the rigid mold and thus transforming the said granular material into a single compact structure which is then subjected to a subsequent sintering phase, and;

(2) The final sintering phase of the not yet cemented particles which form the single structure of the preformed body previously obtained by compression, a phase that consists of subjecting the preformed article to such a thermal treatment that the compressed particles of the preformed structure agglomerate thereby forming a physically continuous structure which is perfectly homogeneous.

In particular, this invention relates to a process for the production of hollow articles of any size from polytetrafluoroethylene and which articles have a relatively complex shape, particularly commercial liquid containers such as, for example, those made of a hollow body closed at one of its ends and having the other end tapering to an almost conical shape and terminating in a neck with an opening.

For purposes of information and not to be construed as limiting the present invention, an apparatus is described hereunder that is suitable for carrying out the process according to this invention, and which is illustrated in the annexed drawing, wherein:

The figure depicts a longitudinal cross-section of a mold consisting of an outside steel casing composed of several pieces joined together by suitable means and designed to resist considerable pressures; the inside cavity of said mold containing a core piece consisting of a hollow, elastic, thermoplastic counter-mold that parallels the contours of said inside cavity and forms therewith an interspace which is to be filled with the polytetrafluoroethylene powder; and mouthpiece of said thermoplastic mold is tightly wedged between the mouth of the mold body and a metal plug directly connected to a compressed fluid feeding pipe.

More particularly, the figure depicts:

(1) The basic section of the mold having a funnel-shaped cavity with a countersunk mouthpiece suitable for holding the edges of the thermoplastic counter-mold tightly wedged between its own wall and the wall of the metal plug 3; the mold may obviously be one of many different base pieces of type 1 which are interchangeable and have cavities of different contours;

(2) The hollow, thermoplastic, elastic counter-mold which parallels the outline of the cavity of the mold but which has smaller overall dimensions;

(3) The bored metal plug of the mold which keeps the rim of the thermoplastic counter-mold 2, tightly wedged against the walls of the countersunk portion of base piece 1, and through a hole in which plug the compressed fluid is fed into said counter-mold;

(4) The threaded locking ring which insures proper locking in the mold body of the bored plug 3;

(5) The middle part of the mold body consisting of a hollow cylinder with a wall of suitable thickness;

(6) The threaded locking ring which tightly joins the two components, 1 and 5, of the mold;

(7) The threaded mold cover which is screwed on to the mold part 5 of the mold itself; and (8) The interspace itself.

The above described apparatus operates in the following manner:

Into part 1 of the mold are placed counter-mold 2, and part 3, locked into place by means of locking-ring 4; then, by means of locking-ring 6, part 5 is fixed against part 1, and the interspace thus formed by the inner walls of 1 and 5 and the outer walls of counter-mold 2 is filled with powdered polytetrafluoroethylene; similarly, the space left open from the top base of counter-mold 2 up to the upper brim of part 5 of the mold is filled with the polymer and the threaded cover is screwed on piece 5. Through the hole of part 3 (bored plug) a compressed fluid is then fed into the thermoplastic hollow counter-mold 2, and exerts such a pressure that the elastic walls of the counter-mold are expanded to press the granular polymer against the rigid walls of the mold body, thereby causing a first mechanical agglomeration of the material particles which thus forms a compact but still physically discontinuous structure. The article thus preformed and still containing counter-mold 2 (which cannot be removed at this stage because of its shape) and the fragility of the preformed article is freed from the mold and placed into an open; heating is then commenced and, as the temperature gradually rises, the thermoplastic counter-mold 2 softens and can be removed by conventional means, for example, manually with pliers or like tools.

Alternatively and preferably, the preformed object which still contains the thermoplastic counter-mold may be placed into the oven in such a way that at least one opening of the molded object itself be turned downwards; with the rising temperature the thermoplastic counter-mold gradually softens, melts and finally flows out by gravity through the opening of the molded object and is then removed.

The temperature is then further increased to its optimum temperature for sintering the particles of the polymer and is maintained at that temperature until the sintering is complete.

A finished article is thus obtained that consists of a material homogeneous throughout and having perfectly smooth surfaces.

The polytetrafluoroethylene employed herein is in a discontinuous powdery state and has a granulometric size of from 30 to 625 mesh and preferably from 50 to 625 mesh (ASTM series).

The elastic, thermoplastic counter-mold 2 may be made of thermoplastic materials of desirable elasticity characteristics i.e., those which melt at a temperature of from about 100° to about 170° C., such as for example, polyethylene, polyvinylchloride, etc.; particular advantages are obtained by using plasticized polyvinylchloride (with a resin to plasticizer ratio of 100:65), which melts at about 150° C. and has a very low viscosity, thus facilitating the process.

The preforming pressure is from between about 50 to 350 atmospheres and is obtained by means of a compressed gaseous or liquid fluid, such as air, $CO_2$, water, and the like.

The preforming pressure is maintained for an interval of time of from between about 0.5 and 5 minutes, and, preferably, from between about 1 and 2 minutes.

The sintering temperature is from between about 350° and about 400° C., and, preferably, from between about 360° and about 380° C.

The preformed article is maintained at the aforesaid sintering temperature for a period of from between about 0.5 to 3 hours for articles of desired thicknesses varying from between about 1 mm. to about 6 mm.

The dimensions of the apparatus and the materials used in the process according to the present invention may obviously vary in practice and depending upon the requirements which may eventually arise without thereby falling within the ambit of this invention.

The polytetrafluoroethylene used in the process of the present invention may be used alone or in combination with a more or less considerable charge of, for example, metal powders, glass fibres, graphite, etc., in order to stress or to introduce particular characteristics into the desired finished product.

The above described process may also be adapted to other technological fields; for example, valuable articles of graphite-carbon having particular electrical characteristics may be prepared by applying the process according to this invention to carbon powders and transforming them into a preformed substance which is then subjected to baking.

To illustrate further the present invention and the advantages thereof, the following specific example is given, it being understood that this is merely intended to be illustrative and not limitative.

*Example 1*

Steel apparatus of the type previously described was used; its parts 5, and 7, having walls with a thickness of 15 mm. and forming an inner cavity of 15 cm. in height and a 7.5 cm. in diameter for its upper base, and having the shape of a short-necked bottle as illustrated in the figure. In the cavity of this apparatus and following the hereinabove described procedure, was placed a hollow counter-mold of plasticized polyvinylchloride having the following composition:

| | P. weight |
|---|---|
| Emulsion resin (PVC), trademark registered as "Sicron Paste 708" | 100 |
| Di-octyl phthalate, trademark registered as "Sicol 150" | 25 |
| Di-iso-decyl-phthalate, trademark registered as "Sicol 184" | 30 |
| Di-octyl-adipate | 10 |
| $CaCO_3$ over ventilated | 10 |
| Stabilizer Barium-Cadmium, trademark registered as "Advastab B105" | 2 |

The walls of said counter-mold had a thickness of 2 mm. and paralleled the outline of the mold cavity, forming between it and the walls of the counter-mold body an interspace of 12 mm. The rim of the mouth of the counter-mold of polyvinylchloride was tightly fixed to the mold by means of the bored piece 3, and locked into place by locking-ring 4. The interspace between the mold and counter-mold was carefully filled with about 200 g. of polytetrafluoroethylene powder having an average granulometric size of 50 mesh; in like manner the space located between the bottom of the counter-mold and the upper edge of part 5 of the mold body was filled. Thereupon the mold was closed with cover 7.

Water was then injected into the plasticized polyvinylchloride counter-mold at a pressure of 250 atm. and this pressure was maintained for about 1 minute. The walls of the counter-mold expanded as a result of this pressure and compressed the granular polytetrafluoroethylene against the rigid walls of the mold-body thereby transforming the material into an object perfectly outlining the shape of the mold cavity. The thickness of the polytetrafluoroethylene layer which initially was 12 mm. was compressed to 3 mm. and the article thus preformed was perfectly homogeneous.

The article thus preformed and still containing the counter-mold, which, owing to the fragility of the preformed molding could not be removed during the previously described compression phase, was put into an oven fitted with a series of suitable grates whereon the molding was placed for baking with its opening facing downwards. The oven was heated and, around 130° C. the thermoplastic counter-mold began to soften; around 150° C. it melted and, due to the forces of gravity, fell from the article being baked and was then removed from the oven. The temperature of the oven was then gradually increased to 370° C. and kept at this temperature for a period of 90 minutes. The bottle thus obtained, having a volumetric capacity of 300 cc., displayed perfectly homogeneous outer and inner walls, as well as homogeneity throughout the mass of the material of the molding itself.

Many apparently widely different embodiments of this invention can be made without departing from the spirit and scope thereof.

We claim:

1. A process for the preparation of a smooth-surfaced, homogeneous, hollow, shaped article of polytetrafluoroethylene having at least one open end and an irregular cross-section of varying radial extent along its longitudinal axis with at least one relatively great radial enlargement tapering to a constriction; comprising providing a rigid mold with a preformed thermoplastic counter-mold disposed therein and there existing a uniform spaced relationship between the inner walls of the said rigid mold and the outer walls of the said counter-mold; the said inner walls of the rigid mold defining the exterior contour of the desired shaped article; the outer walls of the counter-mold generally approximating the interior contour of the desired shaped article; and the interspace between the said rigid mold and the said counter-mold generally approximating the overall geometry of the desired shaped article; introducing powdery polytetrafluoroethylene into and filling the said interspace; compressing the polytetrafluoroethylene particles by exerting a uniform preforming pressure thereon by expanding with a fluid pressure therein the thermoplastic counter-mold thereagainst to create a preform of the shaped article while maintaining the said powdery polytetrafluoroethylene in a state of substantially uniform wall thickness; removing the pressure from the preform and withdrawing the same, which preform contains the counter-mold, from the rigid mold; heating the said preform and contained counter-mold at least to a temperature whereat the counter-mold softens, the softening temperature of the said counter-mold being less than that of the said powdery polytetrafluoroethylene; removing the counter-mold from the preform while in said at least softened condition; and sintering the resultant preformed article.

2. A process according to claim 1, wherein the thermoplastic counter-mold is composed of a material selected from the group consisting of polyethylene, polyvinylchloride, plasticized polyethylene, plasticized polyvinylchloride, and copolymers thereof.

3. A process according to claim 1, wherein the preforming pressure is from between about 50 to 350 atmospheres and is maintained thereat for a period of from about 0.5 to about 5 minutes.

4. A process according to claim 3, wherein the preforming pressure is maintained at an interval of from about 1 to about 2 minutes.

5. A process according to claim 1, wherein the powdery polytetrafluoroethylene has a granulometric distribution of from between about 30 to about 625 mesh.

6. A process according to claim 5, wherein the powdery polytetrafluoroethylene has a granulometric distribution of from between about 50 to about 625 mesh.

7. A process according to claim 1, wherein the sintering temperature is from between about 330° to about 400° C. and is maintained thereat for a period of from between about 0.5 to about 3 hours.

8. A process according to claim 7, wherein the sintering temperature is from between about 360° to about 380° C.

References Cited

UNITED STATES PATENTS

| | | | |
|---|---|---|---|
| 2,929,109 | 3/1960 | Cresap | 264—127 |
| 3,015,855 | 1/1962 | Merkel | 264—127 |

ROBERT F. WHITE, *Primary Examiner.*

JAMES R. HALL, *Assistant Examiner.*

U.S. Cl. X.R.

264—314